(12) United States Patent
Lee

(10) Patent No.: US 10,913,846 B2
(45) Date of Patent: *Feb. 9, 2021

(54) POLYBUTYLENE TEREPHTHALATE ELASTOMER COMPOSITION HAVING EXCELLENT HEAT RESISTANCE

(71) Applicant: YOUNGIL CO., LTD., Gwangju (KR)

(72) Inventor: Ho-Young Lee, Namyangju-si (KR)

(73) Assignee: Youngil Co., Ltd., Gyeonggi-Do (KR)

( * ) Notice: Subject to any disclaimer, the term of this patent is extended or adjusted under 35 U.S.C. 154(b) by 69 days.

This patent is subject to a terminal disclaimer.

(21) Appl. No.: 16/156,244

(22) Filed: Oct. 10, 2018

(65) Prior Publication Data

US 2020/0040178 A1    Feb. 6, 2020

(30) Foreign Application Priority Data

Aug. 2, 2018 (KR) .................. 10-2018-0090136

(51) Int. Cl.
*C08L 67/02* (2006.01)

(52) U.S. Cl.
CPC .......... *C08L 67/02* (2013.01); *C08L 2207/04* (2013.01); *C08L 2207/53* (2013.01)

(58) Field of Classification Search
CPC ... C08L 67/02; C08L 2207/04; C08L 2207/53
See application file for complete search history.

(56) References Cited

U.S. PATENT DOCUMENTS

| 2011/0196071 A1* | 8/2011 | Mentink | .................. | A23G 4/08 |
| | | | | 524/51 |
| 2019/0217584 A1* | 7/2019 | Lee | .......................... | B32B 5/024 |
| 2020/0002529 A1* | 1/2020 | Lee | ............................ | C08J 5/18 |

* cited by examiner

*Primary Examiner* — Sanza L. McClendon
(74) *Attorney, Agent, or Firm* — Rosenberg, Klein & Lee

(57) ABSTRACT

The present invention relates to a polybutylene terephthalate (PBT) elastomer composition having excellent heat resistance, and more particularly to a polybutylene terephthalate (PBT) elastomer composition comprising: a PBT resin; a vegetable oil or an environmentally friendly plasticizer, which serves to reduce the hardness of the PBT resin; a glycol-modified polyethylene terephthalate (PET-G) resin and a thermoplastic polyester elastomer (TPEE) resin, which serve to improve physical properties and processability; and a core-shell type copolymer having excellent miscibility with the plasticizer. In a preferred embodiment, the PBT elastomer composition comprises: 100 parts by weight of a PBT resin; 10 to 120 parts by weight of an environmentally friendly plasticizer; and 10 to 120 parts by weight of a thermoplastic copolyester elastomer (TPEE) resin.

6 Claims, No Drawings

POLYBUTYLENE TEREPHTHALATE ELASTOMER COMPOSITION HAVING EXCELLENT HEAT RESISTANCE

BACKGROUND OF THE INVENTION

Field of the Invention

The present invention relates to a polybutylene terephthalate (PBT) elastomer composition having excellent heat resistance, and more particularly to a polybutylene terephthalate (PBT) elastomer composition having excellent heat resistance, which comprises: a polybutylene terephthalate (PBT) resin; a vegetable oil or an environmentally friendly plasticizer, which serves to reduce the hardness of the PBT resin; a glycol-modified polyethylene terephthalate (PET-G) resin and a thermoplastic polyester elastomer (TPEE) resin, which serve to improve physical properties and processability; and a core-shell type copolymer having excellent miscibility with the plasticizer.

Description of the Prior Art

Polyvinyl chloride (PVC) is a general-use resin having excellent physical properties, including weather resistance, tensile strength, elongation, scratch resistance, adhesion, abrasion resistance and the like. Particularly, soft PVC is a general-use resin which is most widely used in vinyl leather, tarpaulin, films, sheets, injection molded products, extrusion molded products, and the like. However, in recent years, the use of PVC products has been gradually restricted or prohibited due to the human hazards of plasticizers and the environmental problems of PVC resins. Nevertheless, they are still widely used for bags, architectural and advertising applications, etc., due to the absence of alternative raw materials.

In particular, when PVC is used in conjunction with fabric, like the case of vinyl leather or tarpaulin, it is mostly incinerated due to difficulty in recycling, thus causing environmental problems and cost problems. Accordingly, there have been many attempts to replace soft PVC, but soft PVC has been partially replaced and has not been completely replaced.

As a solution to this problem, the present invention is intended to provide a polybutylene terephthalate (PBT) elastomer composition comprising: a polybutylene terephthalate (PBT) resin as a base resin; a polyethylene terephthalate (PET) copolymer, a thermoplastic polyester elastomer (TPEE) resin and a thermoplastic polyurethane resin as co-resins; a vegetable oil or an environmentally friendly plasticizer; and a core-shell type copolymer having excellent miscibility with a liquid such as a vegetable oil or a plasticizer, in which the elastomer composition is non-toxic and has excellent secondary processing properties, including high-frequency adhesion, printability, adhesive adhesion, and the like.

Prior art documents of the present invention include Korean Patent No. 1004614 (Patent Document 1), entitled "PETG-Based Decorative Sheet Having Forming Ability Similar to PVC". Patent Document 1 discloses a decorative sheet comprising a PETG alloy resin obtained by alloying a polyethylene terephthalate glycol (PETG) resin with an elastomer resin, wherein the elastomer resin is an elastomer resin obtained by copolymerizing a polybutylene terephthalate (PBT) resin with polyether glycol.

Although the decorative sheet disclosed in Patent Document 1 has a forming ability similar to that of PVC and is used mainly as a hard sheet, a foam container or the like, Patent Document 1 has a problem in that it is difficult to manufacture a soft film or a soft sheet, due to difficulty in softening.

PRIOR ART DOCUMENTS

Patent Documents (Patent Document 1) Korean Patent No. 1004614, entitled "PETG-Based Decorative Sheet Having Forming Ability Similar to PVC".

SUMMARY OF THE INVENTION

The present invention has been made in order to solve the above-described problem, and it is an object of the present invention to provide a PBT elastomer composition having excellent heat resistance, which is an environmentally friendly composition having better physical properties and processing properties, including cold resistance, heat resistance, oil resistance and the like, than soft PVC, and which can replace injection-molded products, extrusion-molded products, films or sheets, comprising soft PVC, in which the composition can be formed into synthetic resin leather or tarpaulin for outdoor use, and can substitute for olefinic resins, such as PP or PE, and polyurethane resins, which have been difficult to process, due to their poor post-processing properties (high-frequency processability, printability, adhesive properties, etc.), and the composition does not contain a phthalate-based plasticizer such as DOP or DINP, known to be harmful to the human body, and thus may also be used for the production of infants' or children's products or medical supplies.

In one embodiment, the present invention provides a polybutylene terephthalate (PBT) elastomer composition having excellent heat resistance, the composition comprising: 100 parts by weight of a PBT resin; 10 to 120 parts by weight of an environmentally friendly plasticizer; and 10 to 120 parts by weight of a thermoplastic copolyester elastomer (TPEE) resin.

In another embodiment, the PBT elastomer composition may further comprise 10 to 100 parts by weight of a core-shell type copolymer.

In still another embodiment, the PBT elastomer composition may further comprise 10 to 100 parts by weight of a vegetable oil.

In an embodiment, the core-shell type copolymer may comprise any one selected from among an acrylic rubber-based core-shell copolymer, a butadiene rubber-based core-shell type copolymer, and a silicone/acryl rubber-based core-shell copolymer.

In an embodiment, 20 to 100 wt % of the PBT resin may be replaced with a polyethylene terephthalate (PET) copolymer.

In another embodiment, the PBT elastomer composition may further comprise 10 to 100 parts by weight of a thermoplastic polyurethane (TPU) resin, or 10 to 100 wt % of the TPEE (thermoplastic copolyester elastomer) resin may be replaced with the thermoplastic polyurethane (TPU) resin.

DETAILED DESCRIPTION OF THE INVENTION

Hereinafter, the present invention will be described in further detail with reference to embodiments. It is to be understood, however, that these embodiments are for illustrative purposes only and are not intended to limit the scope of the present invention.

Hereinafter, the technical configuration of the present invention will be described with reference to preferred embodiments.

The PBT elastomer composition having excellent heat resistance according to the present invention comprises the following selected components: a PBT resin as a base resin, which has excellent cold resistance, heat resistance and weather resistance; an environmentally friendly plasticizer and a vegetable oil, which serves to reduce the hardness of the PBT resin; a TPEE resin which has good heat resistance, weather resistance and cold resistance and excellent miscibility and compatibility with other resins and serves to improve physical properties such as tensile strength and elongation; a thermoplastic polyurethane (TPU) resin which may replace a portion or all of the TPEE resin and serves to improve adhesion or post-processing properties such as high-frequency processability; and a core-cell type copolymer having good compatibility with the environmentally friendly plasticizer or vegetable oil and also having good compatibility with the PBT resin.

Polybutylene terephthalate (PBT) resin is produced by reacting terephthalic acid with 1,4-butanediol, and is used as engineering plastic (EP).

PBT resin is produced by reacting terephthalic acid with 1,4-butanediol, and is a crystalline resin having excellent heat resistance, chemical resistance and electrical properties, among various engineering plastic (EP) resins. It has a short molding cycle due to its fast crystallization rate, has excellent weather resistance, friction resistance and abrasion resistance properties and excellent dimensional stability, and is used mainly for electrical, electronic and automotive parts. Particularly, it is a resin having excellent heat resistance, has less deterioration in physical properties even at high temperatures (it can be used for a long period of time even at a temperature of 120° C. to 130° C.), and is not deformed even at high temperatures and high loads. It has a melting point of 220° C. to 225° C. It is believed that the physical properties of an elastomer based on PET-G resin can be greatly improved by replacing the PET-G resin with the PBT resin having excellent physical properties.

Example 1

TABLE 1

Examples of raw material compositions (unit: kg)

| | Experimental Examples | | | | | |
|---|---|---|---|---|---|---|
| | 1 | 2 | 3 | 4 | 5 | 6 |
| W300A | 100 | 100 | 100 | 100 | 100 | 100 |
| Plasticizer (NEO-P) | 100 | 150 | 200 | 250 | 300 | 350 |
| State of mixture | Good | Good | Good | Good | Good | Poor |
| W300A | 100 | 100 | 100 | 100 | 100 | 100 |
| Vegetable oil (palm oil) | 50 | 75 | 100 | 125 | 150 | 200 |
| State of mixture | Good | Good | Good | Good | Good | Poor |

(1) W300A: acrylic rubber-based copolymer manufactured by Mitsubishi Rayon Co., Ltd.
(2) NEO-P: the trade name of an environmentally friendly ester-based plasticizer (manufactured by Aekyung Petrochemical Co., Ltd.).
(3) Palm oil: generally known to have relatively better compatibility with resin, among vegetable oils.

Soft PVC is produced by mixing PVC resin with a plasticizer. In this mixing process, the miscibility and compatibility between PVC and the plasticizer are most important. If the miscibility and compatibility are poor, the mixture cannot be used as a product due to poor physical properties and processability, or a composition, if formed, cannot have good quality.

PVC resin is in a powder form and comprises porous particles, and thus a plasticizer is easily absorbed therein even when the PVC resin and the plasticizer are mixed using a super mixer. However, pellet-shaped plastic resins such as PBT, PET-G or TPEE are not easily mixed with a liquid-state material such as oil or a plasticizer.

The powder state, particle state or porosity of resin greatly affects the processability of the resin.

A soft PVC composition in particle form is prepared by placing and mixing PVC resin, a stabilizer, a lubricant, a plasticizer and other additives in a mixer (super mixer) at a temperature of 100° C. or higher, melt-mixing the mixture at a temperature of 170° C. to 190° C., cooling the melt mixture, and cutting the cooled mixture.

In a conventional method for softening a pellet-shaped resin such as PBT or PET-G, the resin is melted in an extruder barrel while oil or a plasticizer is forcibly mixed with the resin by means of a metering oil pump. The hose of the metering oil pump is connected to a hole formed through the side of the extruder barrel, and the oil or plasticizer is fed to the metering oil pump through the hole. In this conventional mixing method, even when the metering pump is used, it is difficult to mix an exact amount of the oil or plasticizer with the resin, and it is substantially impossible to mix 30 parts by weight or more of PBT or PET-G, which has relatively good miscibility with the oil or plasticizer. In addition, even though this mixing is possible, productivity is low.

In order to solve this problem, in the present invention, a core-shell type copolymer in powder form was selected as an intermediate material.

The core-shell type copolymer is used mainly as a PVC impact modifier and is composed of a core-shell structure consisting of a core portion and a shell portion, wherein the shell portion is composed mainly of a resin such as acrylic or SAN resin, and the core portion is composed of a rubber such as acrylic rubber, butadiene rubber or silicone rubber.

A butadiene-based copolymer is widely used due to its excellent compatibility with other resins, and an acrylic or silicone-based copolymer is used mainly as an impact modifier for improving weather resistance. These copolymers are in spherical powder form, have an excellent property of absorbing oil or a plasticizer, and have good compatibility with PBT, PET-G or TPEE resin. Thus, in Example 1, the compatibility and miscibility of W300A (manufactured by Mitsubishi Rayon Co., Ltd., Japan) which is an acrylic core-shell type copolymer in powder form were tested in the same manner as those of PVC.

As shown in Experimental Examples 1 to 6 of Table 1 above, the state of a mixture of NEO-P and palm oil was tested in a super mixer for laboratory use. The amount or state of PVC resin mixed also changes depending on the kind of plasticizer. In addition, the amount or state of W300A mixed also changes depending on the kind of plasticizer or oil. It was determined that NEO-P (Aekyung Petrochemical Co., Ltd.) and palm oil of vegetable oils have relatively good compatibility with W300A. Thus, experiments were performed as shown in Table 1 above, and mixing was performed in a super mixer at a temperature of about 30° C. for 2 minutes.

Although PVC is usually mixed at a temperature of 100° C. or above for about 10 to 20 minutes, W300A should be mixed at a relatively low temperature for a relatively short time in order to prevent caking (agglomeration).

An ester-based plasticizer has good compatibility and miscibility with W300A, compared to vegetable oils or other plasticizers, and thus even when the amount of ester-based plasticizer added increases, the mixture is relatively less sticky. This indicates that a large amount of the ester-based plasticizer can be mixed with W300A.

Experimental Examples 1 to 6 as shown in Table 1 above were performed, and as a result, the state of mixtures in Experimental Examples 1, 2, 3 and 4 was good; however, the mixture in Experimental Example 5 was somewhat sticky, but did not form a cake. In addition, the mixture in Experimental Example 6 was severely sticky and formed a cake, and thus even when PBT resin or other resin in particle form was additionally mixed in the mixing process, feeding of the raw materials was not easy and productivity was also reduced.

Palm oil showed poor compatibility and miscibility with resin compared to NEO-P, and thus the amount of palm oil added was reduced as shown in Table 1 above.

Example 2

TABLE 2-1

Examples of raw material compositions (unit: kg)

| | Experimental Examples | | | | | | |
|---|---|---|---|---|---|---|---|
| Components | 1 | 2 | 3 | 4 | 5 | 6 | 7 |
| PBT | 100 | 100 | 100 | 100 | 100 | 100 | 100 |
| W300A | 0 | 5 | 10 | 30 | 50 | 60 | 70 |
| NEO-P | 10 | 10 | 20 | 60 | 100 | 120 | 140 |
| Compatibility and miscibility | Poor | Good | Good | Good | Good | Good | Poor |

TABLE 2-2

| | Experimental Examples | | | | | | |
|---|---|---|---|---|---|---|---|
| Components | 1 | 2 | 3 | 4 | 5 | 6 | 7 |
| PBT | 100 | 100 | 100 | 100 | 100 | 100 | 100 |
| W300A | 0 | 5 | 10 | 30 | 50 | 60 | 70 |
| Vegetable oil (palm oil) | 10 | 10 | 20 | 60 | 100 | 125 | 150 |
| Compatibility and miscibility | Poor | Good | Good | Good | Good | Good | Poor |

(1) PBT: GP1000S manufactured by LG Chemical Ltd.

(2) W300A: an acrylic rubber-based copolymer manufactured by Mitsubishi Rayon Co., Ltd.

(3) NEO-P: the trade name of an environmentally friendly ester-based plasticizer (Aekyung Petrochemical Co., Ltd.).

In Example 2, the compatibility and miscibility of the PBT resin with the plasticizer or palm oil were mainly tested.

As shown in Experimental Example 3 of Example 1, when 100 parts by weight of W300A was mixed with 200 parts by weight of the plasticizer NEO-P or 150 parts by weight of palm oil, the best state for processing without sticking appeared, and the amount of NEO-P or palm oil added was also appropriate. Thus, in Example 2, this mixing condition was selected, and Experimental Examples 1 to 7 as shown in Tables 2-1 and 2-2 above were performed.

In Experimental Example 1 of Tables 2-1 and 2-1 above, 10 parts by weight of NEO-P alone was added to 100 parts by weight of PBT resin in a mixer, and then mixed by heating at 70° C. for 10 minutes. However, in this case, NEO-P or palm oil was not substantially absorbed, and the mixture was so sticky that it could not be processed by extrusion. In Experimental Examples 2 to 7, W300A and NEO-P were introduced into a mixer and mixed for 1 minute, and then PBT resin was introduced into the mixer and mixed again for 1 minutes, after which the mixture was melt-mixed in a 30-mm twin extruder at a temperature of 220 to 230° C., cooled, cut into particles, and then injection-molded, thereby obtaining specimens. PBT resin is not easy to mix with other resins or additives such as a plasticizer, oil, a lubricant or a filler, compared to PVC resin, and also has poor compatibility compared to PVC resin. Thus, it is not easy to soften PBT resin or improve the physical properties of PBT resin.

In order to overcome such drawbacks, the good compatibility and miscibility of W300A are used. NEO-P is an ester-based environmentally friendly plasticizer and has good compatibility and miscibility with PBT. Among vegetable oils, palm oil is generally used as it is known to have excellent compatibility with resin and is relatively inexpensive. As shown in Experimental Example 5 of Example 2-1, when a relatively large amount of NEO-P was added, a blooming phenomenon was observed, but surface bleeding did not occur. However, in Experimental Example 6 of Table 2-2, the specimen was left to stand for 15 days, and as a result, it was observed that surface bleeding occurred. This phenomenon is believed to be because the compatibility of palm oil was poorer than that of NEO-P.

Phthalate-based plasticizers, including DOP, DINP, DIDP, DBP and the like, and general-use plasticizers that are used mainly for PVC, cause severe surface bleeding due to their poor compatibility with PBT.

However, an ester-based plasticizer had good compatibility and miscibility with PBT, and thus showed good physical properties compared to general-use plasticizers for PVC or compared to vegetable oils. Particularly, it showed greatly improved weather resistance so that it could be used for outdoor applications, including leather or tarpaulin.

The ester-based plasticizer is generally produced by the esterification of an acid with an alcohol, wherein the esterification is generally performed in the presence of an acid catalyst or a metal catalyst. The use of phthalate-based plasticizers has been avoided due to toxicity issues together with the environmental problems of PVC. For this reason, environmentally friendly plasticizers have been developed, including carboxylic aromatic ester, benzenedicarboxylic acid ester, diisononyl ester and the like, which are based on ester-based compounds containing no phthalate and have plasticization efficiency comparable to that of phthalate-based plasticizers, and the use thereof has also increased rapidly. Vegetable oil obtained by esterification of rapeseed oil, soybean oil or palm oil, as well as bio-diesel oil, also has good plasticization efficiency and compatibility. Bio-diesel oil is obtained by esterification of rapeseed oil or soybean oil, and palm oil or waste edible oil is also used.

Experimental Examples 2, 3 4 and 5 of Table 2-1 above showed good compatibility and miscibility, and thus showed no bleeding; however, Experimental Example 6 showed slight bleeding, but it is thought that Experimental Example 6 can be improved. In addition, Experimental Example 7 showed severe bleeding. Meanwhile, Experimental Example 6 of Table 2-2 above showed severe bleeding, and for this reason, blooming occurred even after improvement.

It appears that the reason why bleeding is severe is because the amount of plasticizer liquid-state material (such as palm oil) mixed is excessive compared to the amount of resin mixed.

Soft PVC usually has a plasticizer content of 30 phr or more. For this reason, in order to soften PBT resin so as to substitute for soft PVC, the amount of plasticizer or oil mixed should be increased. If the compatibility of PBT resin with the plasticizer or oil is poor, bleeding or blooming will occur.

The most noticeable side effects of soft resins are bleeding and blooming.

Vegetable oil or biodiesel oil is preferably used for food or toy compositions, and environmentally friendly plasticizers are used for toys and general vinyl products.

with other resins, including PVC, TPU, PET-G and the like. Experimental results indicated that the TPEE resin also has excellent compatibility with PBT resin, and thus is suitable for improving the physical properties of an elastomer based on the PBT resin.

The elasticity of the TPEE resin is exhibited by the hard segment acting as a physical crosslinking point forming crystallinity and by the amorphous soft segment forming flexibility. The hard segment mainly affects the rigidity, modulus, mechanical strength, heat resistance, oil resistance and the like of the resin, and the soft segment affects the rubbery, flexibility and low-temperature properties of the resin. When the ratio of the soft segment to the hard segment is high, the elastomer shows excellent properties, including rebound elasticity, flexibility, impact resistance and the like, which are the properties of elastomers. Thus, when a low-hardness (D hardness: 40 or less) TPEE resin having a high Example 3

TABLE 3-1

Examples of raw material compositions (unit: kg)

| Components | Experimental Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| PBT | 100 | 100 | 100 | 100 | 100 | 100 | 100 | 100 | 100 | 100 | 100 | 100 |
| C223A | 5 | 5 | 10 | 10 | 20 | 40 | 40 | 40 | 100 | 100 | 100 | 100 |
| NEO-P | 10 | 10 | 20 | 20 | 40 | 80 | 80 | 80 | 100 | 120 | 120 | 120 |
| TPEE | 0 | 5 | 10 | 20 | 40 | 40 | 80 | | 100 | | 120 | |
| TPU | 0 | 5 | 10 | 20 | 40 | 40 | | 80 | | 100 | | 120 |
| Compatibility | Poor | Good | Good | Good | Good | Good | Good | Good | Good | Good | Good | Good |
| Miscibility | Good | Good | Good | Good | Good | Good | Good | Good | Good | Good | Good | Good |
| Side effect | Whitening | Poor surface state | | | | Blooming | | | | Blooming | | |

TABLE 3-2

| Components | Experimental Examples | | | | | | | |
|---|---|---|---|---|---|---|---|---|
| | 1 | 2 | 3 | 4 | 5 | 6 | 7 | 8 |
| PET-G (KN100) | 100 | 100 | 100 | 100 | 100 | 100 | 100 | 100 |
| C223A | 15 | 15 | 15 | 15 | 20 | 20 | 20 | 20 |
| NEO-P | 30 | 30 | 30 | 30 | 40 | 40 | 40 | 40 |
| TPEE (Shore D hardness: 40) | 50 | | 100 | | 10 | | 150 | |
| TPU (Shore A hardness: 75) | | 50 | | 100 | | 10 | | 150 |
| Shore A Hardness | 97 | 97 | 96 | 96 | 97 | 97 | 93 | 87 |
| Tensile strength (kgf/mm$^2$) | 1.82 | 1.60 | 1.8 | 96 | 200 | 1.88 | 1.55 | 78 |
| Elongation (g) | 365 | 93 | 378 | 217 | 154 | 100 | 463 | 301 |

(1) TPEE (thermoplastic polyester elastomer): product No. KP3340 manufactured by Kolon Corporation.

(2) PBT: GP1000S manufactured by LG Chemical Ltd.

(3) C223A: butadiene rubber-based core-shell type copolymer manufactured by Mitsubishi Rayon Co., Ltd.

(4) NEO-P: the trade name of an environmentally friendly ester-based plasticizer manufactured by Aekyung Petrochemical Co., Ltd.

TPEE (thermoplastic copolyester elastomer) resin is a block copolymer composed of a hard segment (crystallizable glycol terephthalate) and a soft segment (amorphous elastomeric polytetramethylene ether terephthalate), and has the characteristics of both rubber and engineering plastic. In addition, it has excellent heat resistance, cold resistance and mechanical properties, and also has excellent compatibility soft segment ratio is selected, it exhibits good miscibility and excellent compatibility and also has the effect of reducing hardness.

TPU, a kind of polyurethane resin, has excellent elasticity, transparency, oil resistance and abrasion resistance, and is most frequently used for vehicles, furniture, footwear, sporting goods, medical supplies, and the like. It is being used as a substitute for soft PVC in an expanding field of applications. It includes polyester-based TPU and polyether-based TPU. The polyester-based TPU has excellent abrasion resistance, mechanical properties, chemical resistance and injection molding properties, and the polyether-based TPU is a block copolymer resin having excellent cold and hydrolytic resistance and excellent compatibility and miscibility with other resins such as PVC, ABS, SBS, TPEE or the like. Thus, the TPU resin is used to improve physical properties. Among PET copolymers, PET-G has good physical properties and is most generally used.

In Experimental Example 3, in order to compensate for the deterioration in physical properties, which occurs when PBT resin is mixed with the butadiene rubber-based core-shell type copolymer C223A, the environmentally friendly plasticizer NEO-P and the PET copolymer PET-G resin, experiments were performed as shown in Tables 3-1 and 3-2 above.

When PBT resin or PET-G resin is mixed with other resins or other additives, such as a plasticizer, a lubricant, a filler, a flame retardant or the like, the mechanical properties thereof are more severely deteriorated than those of PVC resin.

Even when the resin is mixed with C223A having relatively good compatibility, whitening occurs and cracking also appears. In addition, the mixture also shows surface defects due to its poor processability. Such phenomena are generally avoided when a liquid material such as a plasticizer or oil is added in an amount of 20% or more. However, addition of an excessive amount of the liquid material results in a reduction in hardness as well as a severe reduction in mechanical properties such as tensile strength, elongation and elasticity.

This problem can be overcome by adding a TPEE resin and TPU resin having the best compatibility with the PBT resin and PET-G resin. When a TPEE resin or TPU resin having low hardness is added, it also has the effect of reducing hardness, and thus the amount of W300A or plasticizer added can be reduced. PBT and PET-G resin have excellent compatibility with TPEE or TPU resin, but do not have good compatibility with W300A.

For this reason, when the amount of C223A added to the PBT resin or PET-G resin increases, deterioration in physical properties, including tensile strength, elongation and elasticity, appears. The TPEE resin or TPU resin has excellent compatibility not only with PBT resin or PET-G resin but also with C223A, and thus acts like a compatibilizing agent. It is believed that there is no suitable compatibilizing agent for the composition of the present invention.

Experimental Example 1 of Table 3-1 above is a composition obtained by mixing PBT resin with C223A and NEO-P, and showed a good mixing state, but showed severe whitening. In Experimental Examples 2 to 6, the amounts of TPEE and TPU resins resin added were gradually increased, and observation of improvement in physical properties was performed. Experimental Example 2 showed slight whitening, but no whitening was observed in a film having a thickness of 0.05 mm or less. However, a poor surface state was observed in an injection-molded specimen. For this reason, the amounts of TPEE and TPU resins resin added were increased as shown in Experimental Examples 3, 4, 5 and 6, and as a result, injection-molded specimens had a good surface state.

Adding a liquid material such as a plasticizer or oil to the PBT resin is an optimal method for softening. However, in order to avoid a side effect such as bleeding or blooming and improve processability and physical properties, the TPEE resin or TPU resin having good compatibility with W300A that has a good property of absorbing the liquid material should be added. However, when the amount of liquid material added increases, the amounts of W300A or TPEE resin and TPU resin added should also be increased at a similar ratio.

In Experimental Examples 7 to 12, the amounts of TPEE and TPU resin added were increased while increasing the amount of NEO-P added, and the miscibility and compatibility of the TPEE resin and TPU resin were compared. As a result, it was shown that the miscibility and the compatibility were similar between Experimental Examples 7 to 12. As shown in Table 3-2 above, each of TPEE resin and TPU resin was added to a composition obtained by adding C223A and NEO-P to PET-G resin, an experiment for comparing physical properties was performed. In the experiment, product No. 240D (manufactured by SK Chemical Co., Ltd) having the lowest Shore D hardness of 40 was used as the TPEE resin, and product No. 475A (manufactured by Kolon Corporation) having a Shore A hardness of 75 was used as the TPU resin.

Generally, soft films or semi-hard sheets have a Shore A hardness of 95 or higher, but in some cases, vinyl leather or thick sheets having a thickness of 0.1 mm or more have a Shore A hardness of 80 or lower. When a composition of the present invention is prepared to have a Shore A hardness of 90 or lower, the mechanical properties thereof, such as tensile strength or elongation, are reduced compared to those of PVC resin, and a phenomenon, such as surface bleeding of a plasticizer or oil or blooming, occurs. The best way to prevent this phenomenon is to minimize the amount of plasticizer or oil added and to select a resin having low hardness. A TPEE resin having a Shore D hardness of 40 or lower is costly and is not easy to produce, but for TPU resins, a low-hardness TPU having a Shore A hardness of 60 or lower is also produced. For this reason, TPU was selected as an alternative to TPEE in order to obtain a composition having a Shore A hardness of 90 or lower, and an experiment for comparing physical properties was performed using the selected TPU. As can be seen in the Experimental Examples of Table 3-2, when TPEE was added, physical properties were generally better than when TPU was added. However, when the amount of TPEE or TPU added increased to 150 parts by weight as in Experimental Examples 7 and 8, the TPU resin showed a good effect of reducing hardness, compared to the TPEE resin. As shown in Experimental Example 8, it was impossible to obtain a Shore A hardness of 78 by adding the TPEE. It is believed that high-frequency and adhesion can also be improved by adding the TPU resin. The greatest drawback of the TPU is poor processability. In Experimental Examples 1, 3, 5 and 7 in which the TPEE resin was added, it was possible to obtain a good specimen even when injection molding was performed without removing moisture, but in Experimental Examples 2, 4, 6 and 8, it was impossible to obtain a good specimen without removing moisture, and the injection molding time was also long, but there was a good effect of improving injection molding processability, compared to the TPU resin. This suggests that processability is improved by adding the TPU resin to the composition of the present invention.

Example 4

TABLE 4

Examples of raw material compositions (unit: kg)

| Components | Experimental Examples | | | | | |
|---|---|---|---|---|---|---|
| | 1 | 2 | 3 | 4 | 5 | 6 |
| PBT | 100 | 50 | 100 | 50 | 100 | 50 |
| W300A | 20 | 20 | 20 | 20 | 20 | 20 |
| Plasticizer | 40 | 40 | 40 | 40 | 40 | 40 |
| TPEE | 50 | 50 | 100 | 100 | 150 | 150 |
| PET-G | 0 | 50 | 0 | 50 | 0 | 50 |
| Tensile strength | 1.61 | 1.56 | 1.65 | 1.50 | 1.73 | 1.55 |
| Miscibility and compatibility | Good | Good | Good | Good | Good | Good |
| Processing temperature (injection; ° C.) | 210 to 220 | 190 to 200 | 210 to 220 | 190 to 200 | 210 to 220 | 190 to 200 |

(1) PBT: GP1000S manufactured by LG Chemical Ltd.
(2) W300A: an acrylic rubber-based copolymer manufactured by Mitsubishi Rayon Co., Ltd.
(3) TPEE (thermoplastic polyester elastomer): product No. KP3340 manufactured by Kolon Corporation.
(4) PET-G: product No. KN100 manufactured by SK Chemical Co., Ltd.

PBT resin has a processing (injection) temperature of about 230° C., and has a relatively high processing temperature of about 210 to 220° C. even when being softened with oil or a plasticizer. Particularly, the injection processing temperature is advantageously low. In Example 4, in order to reduce the processing temperature of a PBT elastomer, experiments were performed as shown in Experimental Examples of Table 4 above. PET-G resin has good compatibility with PBT resin and also with W300A or TPEE resin.

PET-G resin denotes glycol-modified polyethylene terephthalate (PET) resin, and is an amorphous resin obtained by copolymerizing PET resin with CHDM (1,4-cyclohexanedimethanol) as a comonomer for improving the physical properties and processability of the PET resin. It is transparent, has excellent gloss, printability, impact resistance and chemical resistance, has a wide range of processability, and is an environmentally friendly resin which contains no environmental hormone substance and generates no toxic substance when being incinerated. In addition, it is relatively inexpensive, has been used for soft sheets, food containers and the like, and has a low processing temperature of about 190 to 200° C. Generally, a suitable high-frequency processing temperature for the PET-G resin is 160 to 180° C., and the foaming temperature of a foaming agent is preferably 160 to 190° C.

The processing temperature of the PBT elastomer is as high as 210 to 220° C., and thus needs to be reduced by about 20 to 30° C. If the processing temperature is high, the productivity is lowered and the defective rate is also increased. In resin processing, processing temperature and flowability are important factors. In injection molding processing, the lowest possible processing temperature and good melt flow rate can improve processability and reduce processing failure. In extrusion of tubes or release products, low processing temperature and low melt flow rate (high viscosity) can facilitate processing, and in extrusion of films using a T-die, low processing temperature and good melt flow rate improve processability. The processing temperature of PBT resin is about 230° C., which is 20 to 30° C. higher than the processing temperature of PET-G resin. The melt flow index of PBT resin is about 30 g/10 min, and the melt flow index of PET-G resin is about 10 g/min, indicating that the melt flow rate of PBT is better. As shown in Experimental Examples 1, 2, 3, 4, 5 and 6 of Table 4 above, when 50 parts by weight of the PBT resin is replaced by the PET-G resin, the processing temperature can be lowered by 10 to 20° C., and the melt flow index is reduced by about 10 to 15 g/10 min. This indicates that processability can be adjusted by mixing or replacing the PBT resin with the PET-G resin depending on a processing method. The melting temperature and melt index of the TPEE resin are similar to those of the PET-G resin.

In Experimental Example 2 of Table 4 above, an experiment was performed using the PBT resin and the PET-G resin at a ratio of 1:1, and as a result, the processing temperature was lowered by about 20° C. compared to that in Experimental Example 1. Experimental Examples 3, 4, 5 and 6 also showed a good injected surface. However, in Experimental Examples 1 to 6, the tensile strength was reduced due to addition of the PET-G resin. To overcome this reduction, the amount of TPEE resin added was increased. As a result, the tensile strength was slightly improved, and the hardness was also lowered by about 2 to 3.

The reduction in the tensile strength is believed to be because the compatibility of W300A with the PET-G resin is poorer than the compatibility with the PBT resin.

Example 5

TABLE 5

Examples of raw material compositions (unit: kg)

| Components | Experimental Examples | | | | | |
|---|---|---|---|---|---|---|
| | 1 | 2 | 3 | 4 | 5 | 6 |
| PBT | 100 | 100 | 100 | 0 | 0 | 0 |
| W300A | 0 | 10 | 20 | 0 | 10 | 20 |
| C-223A | 20 | 10 | 0 | 20 | 10 | 0 |
| Plasticizer (NEO-P) | 40 | 40 | 40 | 40 | 40 | 40 |
| TPEE | 100 | 100 | 100 | 100 | 100 | 100 |
| PET-G | 0 | 0 | 0 | 100 | 100 | 100 |
| Hardness (Shore A) | 94 | 92 | 90 | 92 | 92 | 90 |
| Tensile strength (kgf/mm$^2$) | 1.73 | 1.67 | 1.71 | 1.70 | 1.66 | 1.65 |
| Injection temperature (° C.) | 210 | 210 | 210 | 190 | 190 | 190 |

TABLE 5-continued

Examples of raw material compositions (unit: kg)

| Components | Experimental Examples | | | | | |
|---|---|---|---|---|---|---|
| | 1 | 2 | 3 | 4 | 5 | 6 |
| Miscibility and compatibility | Good | Good | Good | Good | Good | Good |
| Whether resistance (1 month of outdoor exposure) | Discolored | Slightly discolored | Not discolored | Discolored | Slightly discolored | Not discolored |

(1) PBT: GP1000S manufactured by LG Chemical Ltd.
(2) W300A: an acrylic rubber-based copolymer manufactured by Mitsubishi Rayon Co., Ltd.
(3) C-223A: manufactured by Mitsubishi Rayon Co., Ltd.
(4) TPEE (thermoplastic polyester elastomer): product No. KP3340 manufactured by Kolon Corporation.
(5) PET-G: product No. KN100 manufactured by SK Chemical Co., Ltd.

In order to soften a pellet-shaped raw material (such as PBT or PET-G) by a compounding method, the absorbability and compatibility of a liquid material such as oil or a plasticizer are important. Generally, in order to enhance the impact strength of plastic resin such as PVC, PS or PP, acrylic rubber or butadiene-based rubber is mainly added to enhance the impact strength. Bale acrylic rubber or butadiene rubber is processed using a machine such as kneader according to a method similar to a rubber processing method, but is disadvantageous in terms of productivity or convenience. For this reason, a powdery core-shell type copolymer or a pellet-shaped material such as SBS or SEBS is mainly used.

In Example 5, the compatibility of PBT resin and PET-G resin with an acrylic rubber-based copolymer or a butadiene tuber-based copolymer, and changes in the physical properties of the resin, were tested. For compositions based on PBT resin (Experimental Examples 1 to 3 of Table 5 above) and compositions based on PET-G resin (Experimental Examples 4 to 6), the changes caused by addition of W300A (acrylic rubber-based copolymer) and C-223A (butadiene rubber-based copolymer: MBS) were compared.

As shown in Experimental Examples 1, 3, 4 and 5, C-223A was replaced with W300A, and as a result, the Shore A hardness decreased by about 2 to 4. In Experimental Examples 1 and 3, the tensile strength was good despite the lower hardness.

This indicates that W300A has better compatibility than C-223A. In Experimental Examples 4 to 6, there was no great change. It is believed that the compatibility of the PET-G resin with W300A does not greatly differ from the compatibility of the PET-G resin with C-223A, unlike the case of the PBT resin. The injection molding temperature of the specimen was 20° C. higher in the PBT resin composition than in the PET-G resin composition. In addition, as shown in Experimental Examples 1 to 3 and 4 to 6, W300A showed good weather resistance.

This is believed to be because the weather resistance of acrylic rubber is better than that of acrylic rubber. In the case of a composition based on PET-G resin, the weather resistance can be improved by replacing butadiene rubber-based C-223A(MBS) with acrylic rubber-based W300A, and thus the composition can also be used for outdoor applications.

Example 6

TABLE 5

Examples of raw material compositions (unit: kg)

| | Experimental Examples | | |
|---|---|---|---|
| | Specimen 1 | Specimen 2 | Specimen 3 |
| Kind of resin: parts | PVC: 100 | PET-G: 100 | PBT: 100 |
| Plasticizer (NEO-P): parts | 40 | 40 | 40 |
| C223A | | 20 | 20 |
| Hardness (Shore A) | 94 ± 3 | 95 ± 3 | 94 ± 3 |
| Thermal property (VSP): 4.6 kg/cm$^2$ · ° C. | 65.4° C. | 67.6° C. | 129/2° C. |
| Cold resistance (LTB): ° C. | −20 | −53 or less (not destroyed) | −53 or less (not destroyed) |

※VSP (Vicat softening temperature): ASTM D1525

The biggest drawbacks of soft PVC are poor heat resistance and cold resistance. Even when a heat-resistant plasticizer such as TOTM (trioctyl trimellitate) or a cold-resistant plasticizer is added to the soft PVC in order to overcome these drawbacks, improvement is limited. Thus, it is impossible to use the soft PVC in applications requiring a heat resistance of 100° C. or higher or a cold resistance of −30° C. or lower. In Example 6, Experimental Examples as shown in Table 6 above were performed. Heat resistance and cold resistance were compared between specimens 1, 2 and 3 at similar hardnesses, and as a result, it could be seen that the heat resistance or the cold resistance changed depending on the physical properties of the resin. The heat distortion temperatures of specimens 1 and 2 were similar, and the heat distortion temperature of specimen 3 based on the PBT resin was 129.2° C., which was the highest heat distortion temperature among thermoplastic resins having similar hardnesses. This heat distortion temperature (HDT) of specimen 3 is believed to be because the heat distortion temperature of the PBT resin is as high as about 155° C. (4.6 kg/cm$^2$). It is believed that the cold resistances (LTB) of specimens 2 and 3 are significantly better than that of PVC and are similar to that of a styrene-based block copolymer having excellent cold resistance, and that the cold resistance of the PBT resin is similar to that of the PET-G resin.

From the results of the Experimental Examples as described above, it is believed that the mixing ratio of the PBT resin and the PET-G resin and the choice of the acrylic rubber-based copolymer or the butadiene-based copolymer depending on the intended use of the composition are important factors that affect the physical properties of the composition. In addition, it is thought that compositions for various applications can be obtained by adding additives such as a filler, a flame retardant, a lubricant, a UV blocking agent, an antioxidant, a processing aid or a foaming agent.

As described above, the PBT elastomer composition having excellent heat resistance according to the present invention is an environmentally friendly resin composition having better physical properties and processing properties, including cold resistance, heat resistance, oil resistance and the like, than soft PVC, and can replace injection-molded products, extrusion-molded products, films or sheets, which comprise soft PVC. Furthermore, the PBT elastomer composition according to the present invention can be formed into synthetic resin leather or tarpaulin for outdoor use, and can substitute for olefinic resins, such as PP or PE, and polyurethane resins, which have been difficult to process, due to their poor post-processing properties (high-frequency processability, printability, adhesive properties, etc.). In addition, the PBT elastomer composition according to the present invention does not contain a phthalate-based plasticizer such as DOP or DINP, known to be harmful to the human body, and thus can also be used for the production of infants' or children's products or medical supplies.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A polybutylene terephthalate (PBT) elastomer composition having excellent heat resistance, the composition comprising:
   100 parts by weight of a PBT resin;
   10 to 120 parts by weight of an environmentally friendly plasticizer; and
   10 to 120 parts by weight of a thermoplastic copolyester elastomer (TPEE) resin.

2. The PBT elastomer composition of claim 1, further comprising 10 to 100 parts by weight of a core-shell type copolymer.

3. The PBT elastomer composition of claim 1, further comprising 10 to 100 parts by weight of a vegetable oil.

4. The PBT elastomer composition of claim 2, wherein the core-shell type copolymer comprises any one selected from among an acrylic rubber-based core-shell copolymer, a butadiene rubber-based core-shell type copolymer, and a silicone/acryl rubber-based core-shell copolymer.

5. The PBT elastomer composition of claim 1, wherein 20 to 100 wt % of the PBT resin is replaced with a polyethylene terephthalate (PET) copolymer.

6. The PBT elastomer composition of claim 1, further comprising 10 to 100 parts by weight of a thermoplastic polyurethane (TPU) resin, or wherein 10 to 100 wt % of the TPEE resin is replaced with the TPU resin.

* * * * *